US012715622B2

(12) United States Patent
Jain et al.

(10) Patent No.: US 12,715,622 B2
(45) Date of Patent: Aug. 25, 2026

(54) SYSTEM AND METHOD OF EJECTING A PAYLOAD FROM AN EXTRATERRESTRIAL SURFACE

(71) Applicant: Honeybee Robotics, LLC, Longmont, CO (US)

(72) Inventors: Anchal Jain, Longmont, CO (US); Sean O'Brien, Kent, WA (US); Dara Sabahi, Longmont, CO (US); Dean Bergman, Altadena, CA (US)

(73) Assignee: Honeybee Robotics, LLC, Longmont, CO (US)

( * ) Notice: Subject to any disclaimer, the term of this patent is extended or adjusted under 35 U.S.C. 154(b) by 0 days.

(21) Appl. No.: 19/293,623

(22) Filed: Aug. 7, 2025

(65) Prior Publication Data

US 2026/0184446 A1 Jul. 2, 2026

Related U.S. Application Data

(63) Continuation of application No. 19/006,885, filed on Dec. 31, 2024, now Pat. No. 12,415,629.

(51) Int. Cl.
*B64G 1/64* (2006.01)

(52) U.S. Cl.
CPC .................................. *B64G 1/6457* (2023.08)

(58) Field of Classification Search
CPC ......... B64G 1/6457; B64G 1/641; F41B 7/00; Y10T 292/0838
See application file for complete search history.

(56) References Cited

U.S. PATENT DOCUMENTS

| | | | | |
|---|---|---|---|---|
| 4,067,308 | A | 1/1978 | Andersen et al. | |
| 5,226,617 | A | 7/1993 | Panin | |
| 12,415,629 | B1 | 9/2025 | Jain et al. | |
| 2025/0304288 | A1* | 10/2025 | Ionno | B64G 1/6457 |

FOREIGN PATENT DOCUMENTS

| | | | |
|---|---|---|---|
| CN | 102700729 | A | 10/2012 |
| CN | 110239966 | A | 9/2019 |
| KR | 10-2007-0113934 | A | 11/2007 |
| RU | 2779426 | | 9/2022 |

* cited by examiner

*Primary Examiner* — Valentina Xavier
(74) *Attorney, Agent, or Firm* — McCarter & English, LLP; Dave S. Christensen

(57) ABSTRACT

A spin ejection mechanism and a method of launching objects from extraterrestrial sites is disclosed. The mechanism includes a first bracket. At least one second bracket is spaced apart from the first bracket. At least one guide mechanism is operably coupled between the first bracket and one of the at least one second brackets. The at least one guide mechanism is configured to axially restrain the second bracket. At least one releasable lock mechanism is operably coupled to the at least one second bracket and configured to initiate restrained movement of one of the at least one guide mechanism. A spring-loaded lock mechanism is coupled to the first bracket and configured to initiate unrestrained movement of the at least one guide mechanism.

20 Claims, 17 Drawing Sheets

SYSTEM AND METHOD OF EJECTING A PAYLOAD FROM AN EXTRATERRESTRIAL SURFACE

CROSS REFERENCE TO RELATED APPLICATIONS

This application is a continuation of U.S. patent application Ser. No. 19/006,885 filed on Dec. 31, 2024, the contents of which is hereby incorporated herein by reference for all purposes.

BACKGROUND OF THE DISCLOSURE

The subject matter disclosed herein relates to a system for ejecting a payload from an extraterrestrial vehicle that simultaneously translates and rotates the payload relative to the vehicle.

Marman clamps release rings are commonly used to deploy payloads from an extraterrestrial surface, such as on a spacecraft for example. A Marman clamp is a band clamp that allows two cylindrical interfaces to be clamped together. A typical Marman clamp system is found in NASA's Marman Clamp System Design Guidelines, Guideline No. GD-ED-2214.

Disclosed herein are payload ejection systems providing rotational force to a payload while reducing the amount of material needed for the systems as compared to existing solutions.

BRIEF DESCRIPTION OF THE DISCLOSURE

According to one aspect of the disclosure a spin ejection mechanism is disclosed including a first bracket; at least one second bracket spaced apart from the first bracket; at least one guide mechanism operably coupled between the first bracket and one of the at least one second brackets, the at least one guide mechanism configured to axially restrain the second bracket; at least one releasable lock mechanism operably coupled to the at least one second bracket and configured to initiate restrained movement of one of the at least one guide mechanism; and a spring-loaded lock mechanism coupled to the first bracket and configured to initiate unrestrained movement of the at least one guide mechanism.

In addition to one or more of the features described herein, or as an alternative, further embodiments of the mechanism may include a guide mechanism including at least one guide roller; and a helical guide rail engaged with the at least one guide roller, wherein the guide mechanism is configured to move the at least one guide roller along the helical guide rail upon release of the latch.

In addition to one or more of the features described herein, or as an alternative, further embodiments of the mechanism may include a helical guide rail including a cradle configured to retain the at least one guide roller in a second position.

In addition to one or more of the features described herein, or as an alternative, further embodiments of the mechanism may include a spring-loaded lock mechanism configured to move the at least one guide roller past the cradle.

In addition to one or more of the features described herein, or as an alternative, further embodiments of the mechanism may include at least one releasable lock mechanism configured to move the at least one guide roller into the cradle.

In addition to one or more of the features described herein, or as an alternative, further embodiments of the mechanism may include a spring-loaded lock mechanism arranged perpendicular to a plane of the first bracket.

In addition to one or more of the features described herein, or as an alternative, further embodiments of the mechanism may include each of the at least one releasable lock mechanisms configured to activate in series.

In addition to one or more of the features described herein, or as an alternative, further embodiments of the mechanism may include a spring assembly operably coupled between the first bracket and one of the at least one second bracket in a compressed position.

In addition to one or more of the features described herein, or as an alternative, further embodiments of the mechanism may include a spring assembly configured to move to an expanded position upon release of the spring-loaded lock mechanism.

In addition to one or more of the features described herein, or as an alternative, further embodiments of the mechanism may include a spring assembly is configured to propel the at least one second bracket as the spring assembly moves to the expanded position.

In addition to one or more of the features described herein, or as an alternative, further embodiments of the mechanism may include a spin ejection mechanism configured to launch an object situated on the at least one second bracket.

In addition to one or more of the features described herein, or as an alternative, a method of launching objects from extraterrestrial sites includes providing the spin ejection mechanism; coupling an object to the at least one second bracket; releasing the at least one releasable lock mechanism; and releasing the spring-loaded lock mechanism to initiate unrestrained movement of the at least one guide mechanism, moving the second bracket from a first position to a second position, the second position being in a direction away from the first bracket.

In addition to one or more of the features described herein, or as an alternative, the method includes moving at least one guide roller from a cradle along a helical guide rail of the guide mechanism upon release of the spring-loaded lock mechanism.

In addition to one or more of the features described herein, or as an alternative, the method includes selectively retaining the at least one roller in the cradle when in the second position.

In addition to one or more of the features described herein, or as an alternative, the method includes releasing the spring-loaded lock mechanism after the at least one guide roller is retained by the cradle.

In addition to one or more of the features described herein, or as an alternative, the method includes activating the at least one releasable lock mechanisms in series.

In addition to one or more of the features described herein, or as an alternative, the spin ejection mechanism further comprises a spring assembly operably coupled between the first bracket and one of the at least one second bracket in a compressed position.

In addition to one or more of the features described herein, or as an alternative, the method includes rotating the second bracket while moving the spring assembly to an expanded position upon release of the latch.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

One disadvantage of the Marman clamp is the mass and volume of the clamp required to deploy a payload. As the desire for larger and correspondingly heavier payloads increases, logistical issues are created in deploying the payloads from an extraterrestrial surface.

Other commonly used devices require precisely-timed simultaneous firing of release mechanisms to achieve a desired velocity and spin rate. Such devices may be prone to failure due to misfire or mistiming in one or more of the release mechanisms that causes an undesired force or torque loading on the payload.

While existing payload ejection systems are suitable for their intended purposes the need for improvement remains, particularly in providing a mechanism having the features described herein.

Embodiments of the present disclosure provide for precise deployment of a payload without requiring simultaneous release of multiple Hold Down Release Mechanisms (HDRMs). Further embodiments of the present disclosure provide for reduced or minimal tip-off and lateral velocity imparted on the payload. Further embodiments of the present disclosure impart low-uncertainty axial velocity and spin rate on the payload without initiating the simultaneous release of multiple Hold Down Release Mechanisms (HDRMs). The device does not use precise timing and "simultaneous" release of multiple release devices in order to provide predictable, reliable performance. Rather the device is configured to release one or more releasable lock mechanisms before release of a spring-loaded lock mechanism.

Figure 1:
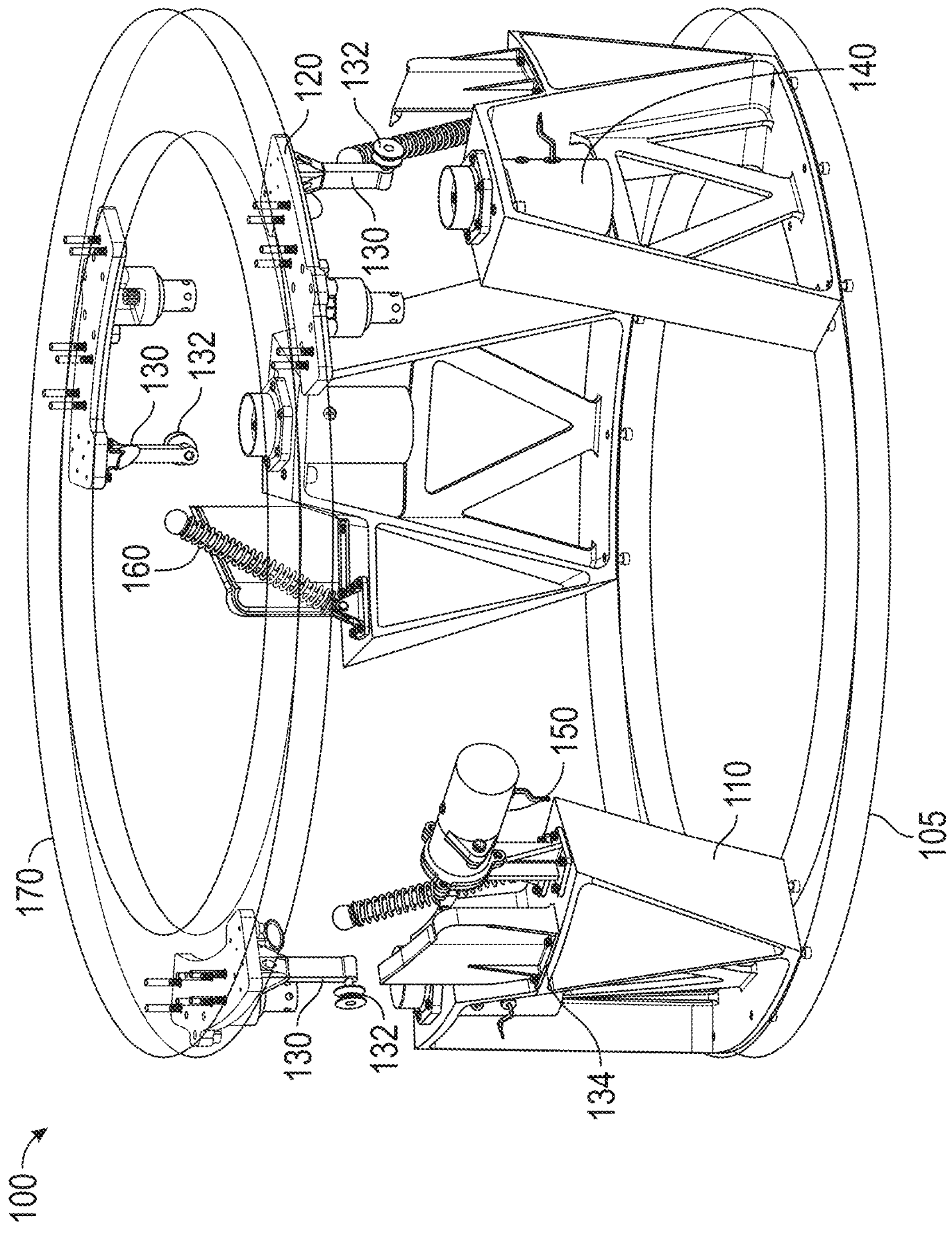
FIG. 1 is a perspective view of a spin ejection mechanism supporting a payload in accordance with an embodiment.

Referring now to FIG. 1, an embodiment is shown of a spin ejection mechanism 100. In an embodiment, the spin ejection mechanism 100 includes a first bracket 110 and a second bracket 120 spaced apart from the first bracket 110. The brackets 110, 120 may be mounted to a frame 105. In an embodiment, the frame 105 is integrated into a spacecraft or an extraterrestrial vehicle. The second bracket 120 may be separated from the first bracket 110 by a distance ranging from 10 cm-100 cm. In some embodiments, the distance between the first bracket 110 and the second bracket may be more than 100 cm In some embodiments, the spin ejection mechanism 100 includes multiple first brackets 110 and multiple corresponding second brackets 120. FIG. 1 depicts an embodiment including three first brackets 110 and two second brackets 120 but embodiments of the spin ejection mechanism 100 may include different amount of brackets. It should be appreciated that in the illustrated embodiment the brackets 110, 120 are disposed equidistant from each other.

The spin ejection mechanism 100 may be configured to launch a payload 170 (i.e., an object, capsule, or sample) situated on the second bracket 120. As discussed in more detail herein, the mechanism 100 is configured to selectively release the second bracket 120 from the first bracket 110 (and hence the payload 170) with a desired translational and rotational motion.

The spin ejection mechanism 100 may further include at least one guide mechanism 130 operably coupled between a first bracket 110 and a second bracket 120. In some embodiments, the guide mechanism 130 is configured to directly axially restrain the second bracket 120. In embodiments with multiple first and second brackets, the spin ejection mechanism 100 includes a plurality of guide mechanisms 130 that are configured to selectively and axially restrain a respective second bracket 120. It should be appreciated that while the illustrated embodiments depict three guide mechanisms 130, this is for example purposes and the claims should not be so limited. In other embodiments, the spin ejection mechanism 100 may have more or fewer guide mechanisms 130.

The guide mechanism 130 may include at least one guide roller 132 and a helical guide rail 134 operably coupled to the guide roller 132. In the illustrated embodiment, the guide mechanism 130 includes a guide roller 132 extending from the second bracket 120 towards the first bracket 110. In some embodiments, the guide mechanism 130 include multiple guide rollers 132 that are spaced apart to allow the helical guide rail 134 to be disposed therebetween.

The helical guide rail 134 may include a cradle 136 (discussed in further detail below with regards to FIG. 2B) shaped to retrain movement of the guide roller 132. The guide mechanism 130 may be configured to release the guide roller 132 from the cradle 136 upon release of a spring-loaded lock mechanism 150 as discussed in further detail below. In some embodiments, a patterned series of helical guide rails 134 and guide rollers 132 is provided and configured to control and constrain the motion of ejection of the payload 170 to a desired helix path (i.e., a combination of spin and axial velocity). The combination of helical guide rails 134 and guide rollers 132 may impart a reduced or minimal amount of tip-off and lateral velocity on the payload 170 while providing high precision for imparted axial velocity and spin rate.

At least one releasable lock mechanism 140 may be operably coupled to a first bracket 110 and operably coupled to a second bracket 120. The releasable lock mechanism 140 may be configured to initiate restrained movement of the guide mechanism 130. In some embodiments, the at least one releasable lock mechanism 140 is oriented to impart a force in a direction towards the second bracket 120. Such a force causes movement of the second bracket 120, for example in a counterclockwise direction. In an embodiment, the releasable lock mechanism 140 is a Model ERM2000 launch lock device manufactured by Ensign-Bickford Aerospace & Defense of Simsbury, Connecticut. The releasable lock mechanism 140 includes a biasing member (not shown), such as a spring for example, that is selectively released to initiate movement of the second bracket 120.

In further embodiments, the releasable lock mechanisms 140 are configured to activate in series. In such embodiments, the order of activation of the releasable lock mechanisms 140 does not affect ejection of the payload 170. No motion between the releasable lock mechanism 140 and payload 170 is expected while activation of the releasable lock mechanisms 140 occurs. The two steps of releasing the releasable lock mechanisms 140 before the spring-loaded lock mechanism 150 allows the payload 170 to be released without precise/simultaneous activation timing of the releasable lock mechanisms 140.

The spin ejection mechanism 100 may further include a spring-loaded lock mechanism 150 coupled to a first bracket 110 and releasably coupled to the respective guide mechanism 130. The spring-loaded lock mechanism 150 may be arranged substantially perpendicular to a plane of the first bracket 110, imparting a force perpendicular to the plane of the first bracket 110. In an embodiment, the spring-loaded lock mechanism 150 is a model ERM4000 launch lock device manufactured by Ensign-Bickford Aerospace & Defense of Simsbury, Connecticut.

Figure 6:
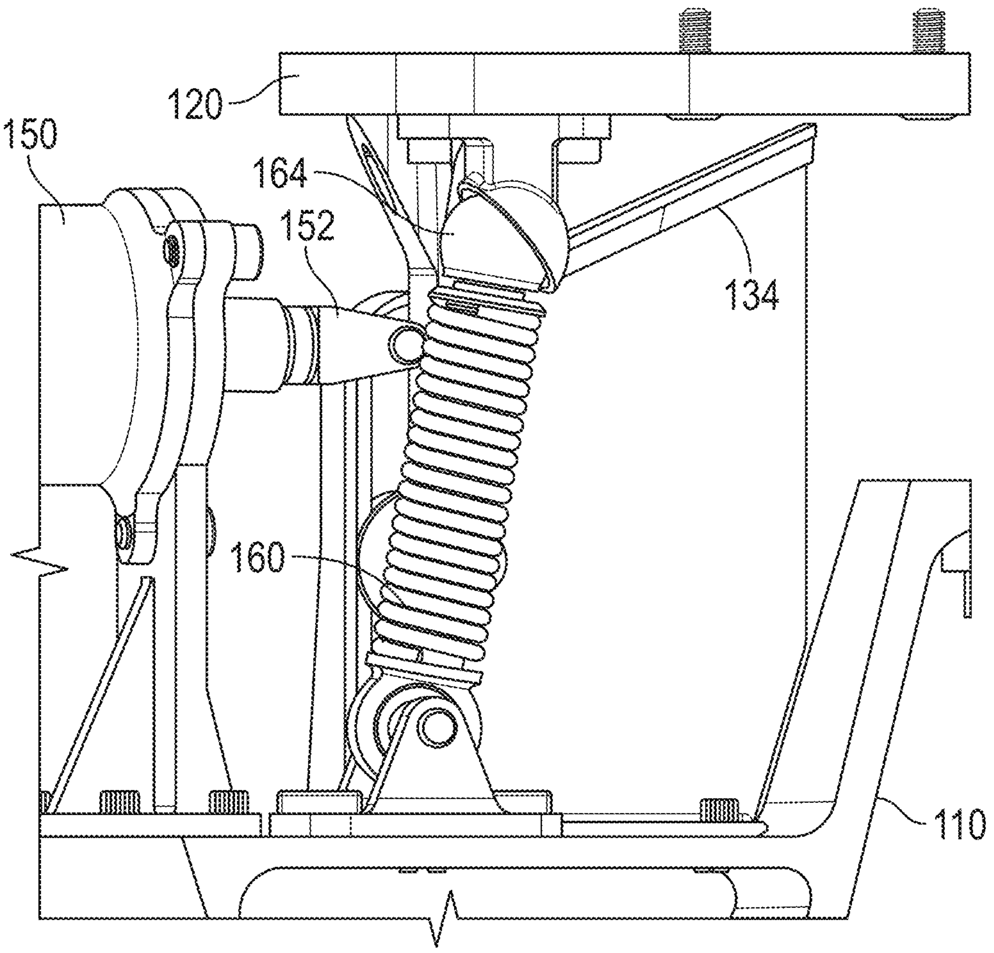
FIG. 6 is a side view of the spring assembly of FIG. 1 in accordance with an embodiment.

The spin ejection mechanism 100 may further include at least one spring assembly 160 operably coupled between a first bracket 112 and a second bracket 120 when in a compressed position. Compression of spring assembly 160 is discussed in further detail below with regards to FIG. 6. The spring assembly 160 may be arranged on an angle relative to a plane of the first bracket 110, the angle being greater than zero degrees and less than 90 degrees. In embodiments including multiple spring assemblies 160, each spring assembly 160 may be oriented at the same angle. In an embodiment, the spring assembly 160 is arranged on an angle of 23 degrees relative to an axis extending perpendicular to the first bracket 110.

Figure 2A:
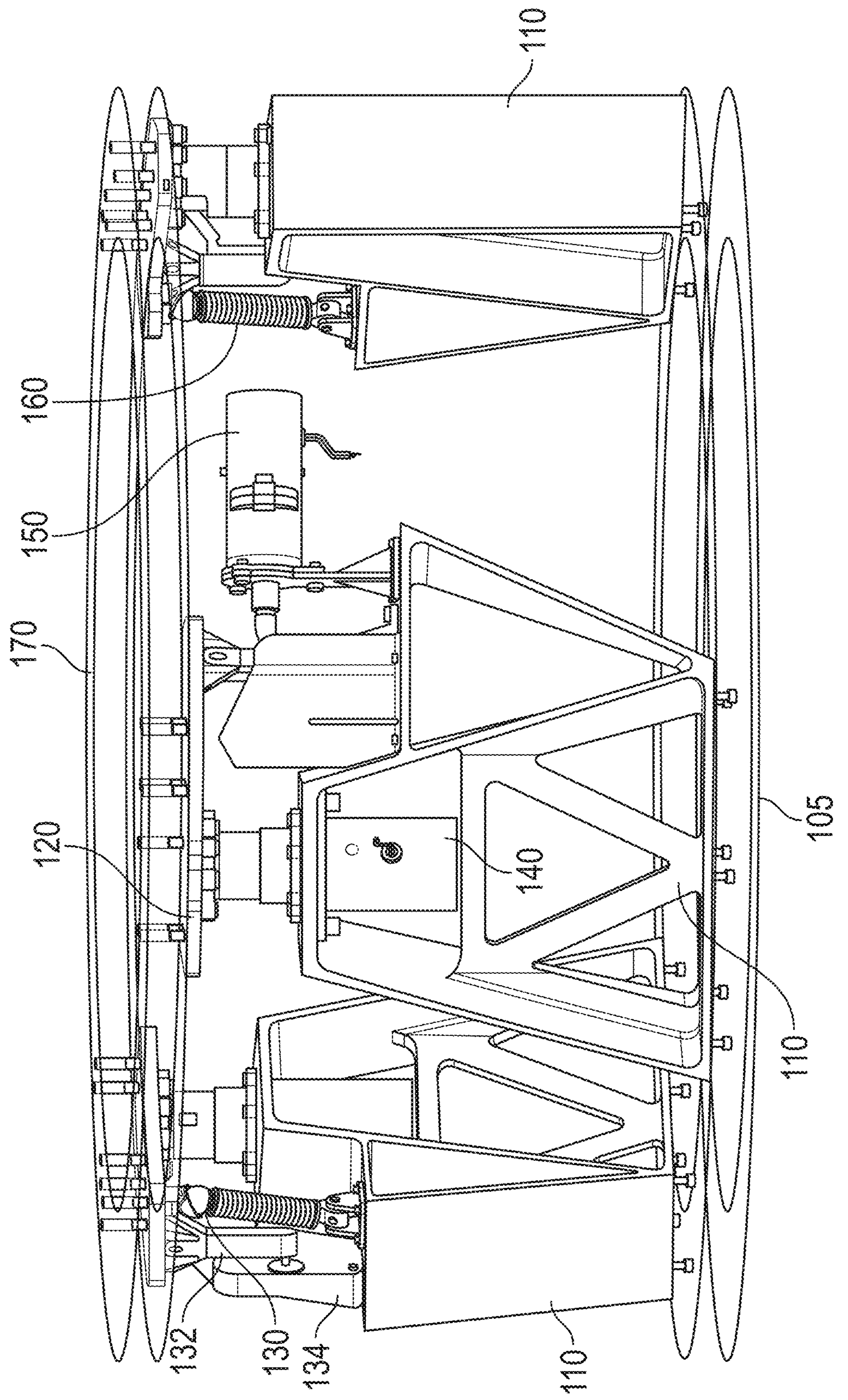
FIG. 2A is a side view of the spin ejection mechanism of FIG. 1 depicting release of a releasable lock mechanism in accordance with an embodiment.

Referring now to FIGS. 2A-2F, the operation of the mechanism 100 is shown and described. In this embodiment, the releasable lock mechanism 140 may be configured to initiate restrained movement of the second bracket 120. In embodiments with multiple second brackets 120, each bracket 120 is paired with a corresponding releasable lock mechanism 140. FIG. 2A depicts release of the releasable lock mechanism 140, which is depicted in more detail in FIGS. 3A and 3B.

Releasable lock mechanism 140 may include an ejector release mechanism (ERM) 141 operably coupled to a coupler 143. A portion of the ERM 141 and a portion of the coupler 143 may be surrounded by a cup 142. Cup 142 may be fixedly couple to a first bracket 110. A cone 144 may be situated above the cup 142 and may surround a portion of the coupler 143. The cone 144 may be fixedly connected to a second bracket 120. A fastener 145 may join the coupler 143 to a cone 144. Release of the ERM 141 may release the coupler 143, thereby releasing the cone 144 from the cup 142 and releasing the second bracket 120 from the first bracket 110.

Figure 2B:
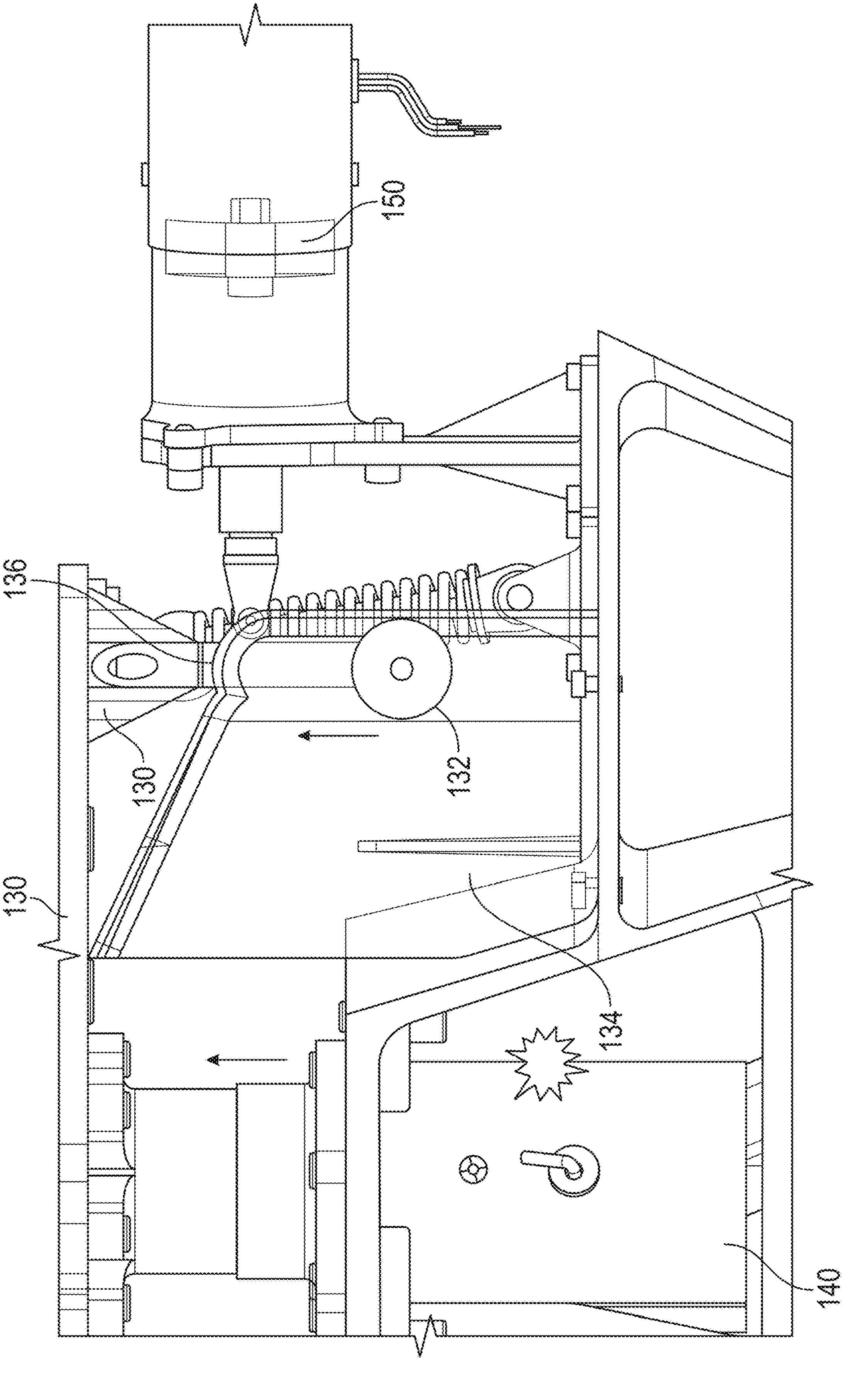
FIG. 2B is a side view of the spin ejection mechanism of FIG. 1 depicting a guide roller situated within a cradle in accordance with an embodiment.
Figure 2C:
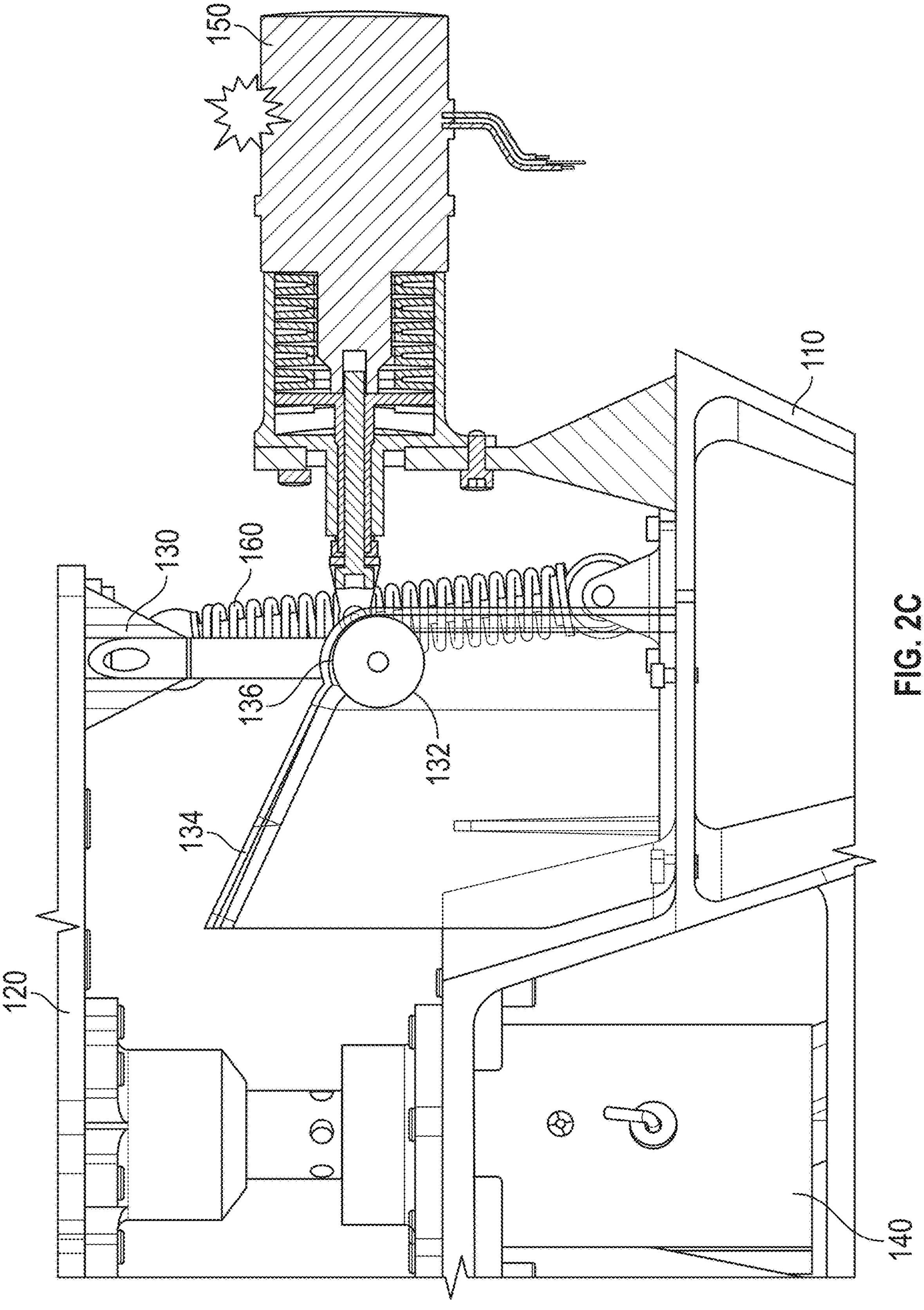
FIG. 2C is a side view of the spin ejection mechanism of FIG. 1 depicting release of a spring-loaded lock mechanism in accordance with an embodiment.
Figure 3A:
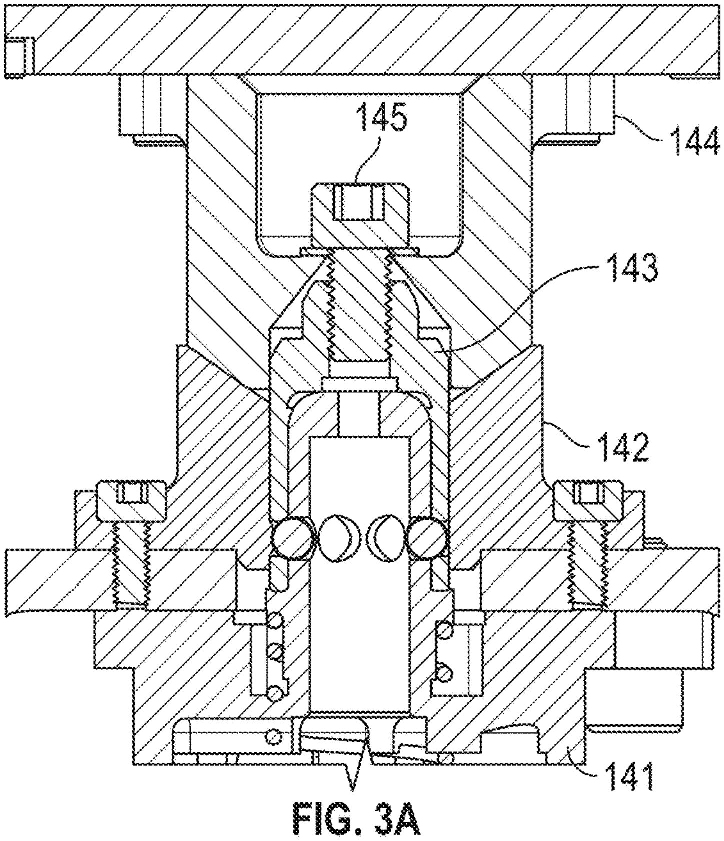
FIG. 3A is a section view of an undeployed releasable lock mechanism in accordance with an embodiment.
Figure 3B:
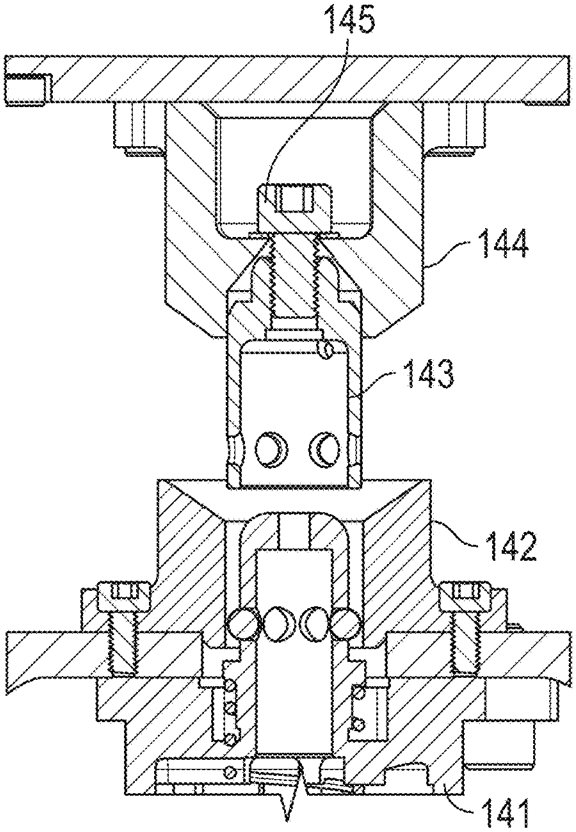
FIG. 3B is a section view of a deployed releasable lock mechanism in accordance with an embodiment.

FIG. 2B depicts movement of the guide roller 132 towards a cradle 136. Release of the releasable lock mechanism 140 initiates upward movement of the second bracket 120 and the guide roller 132 coupled to the second bracket 120. In an embodiment a biasing member, such as spring assembly 160, also contributes to the movement of the second bracket 120. Movement of the guide roller 132, and therefore the second bracket 120, is restrained once the guide roller contacts the cradle 136. FIG. 2C depicts the guide roller 132 sitting within the cradle 136.

Figure 2D:
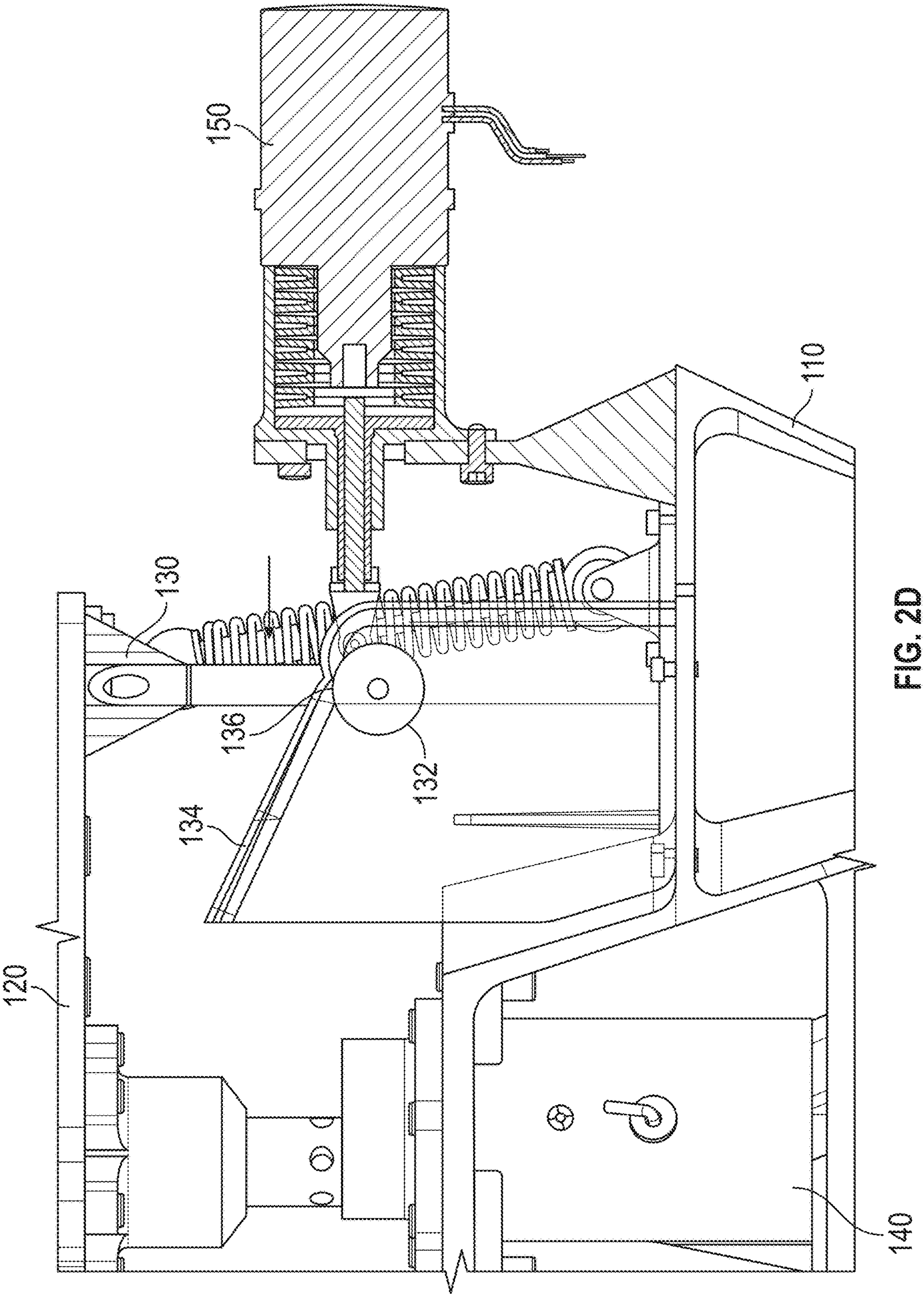
FIG. 2D is a side view of the spin ejection mechanism of FIG. 1 depicting actuation of a guide roller by a spring-loaded lock mechanism in accordance with an embodiment.
Figure 2E:
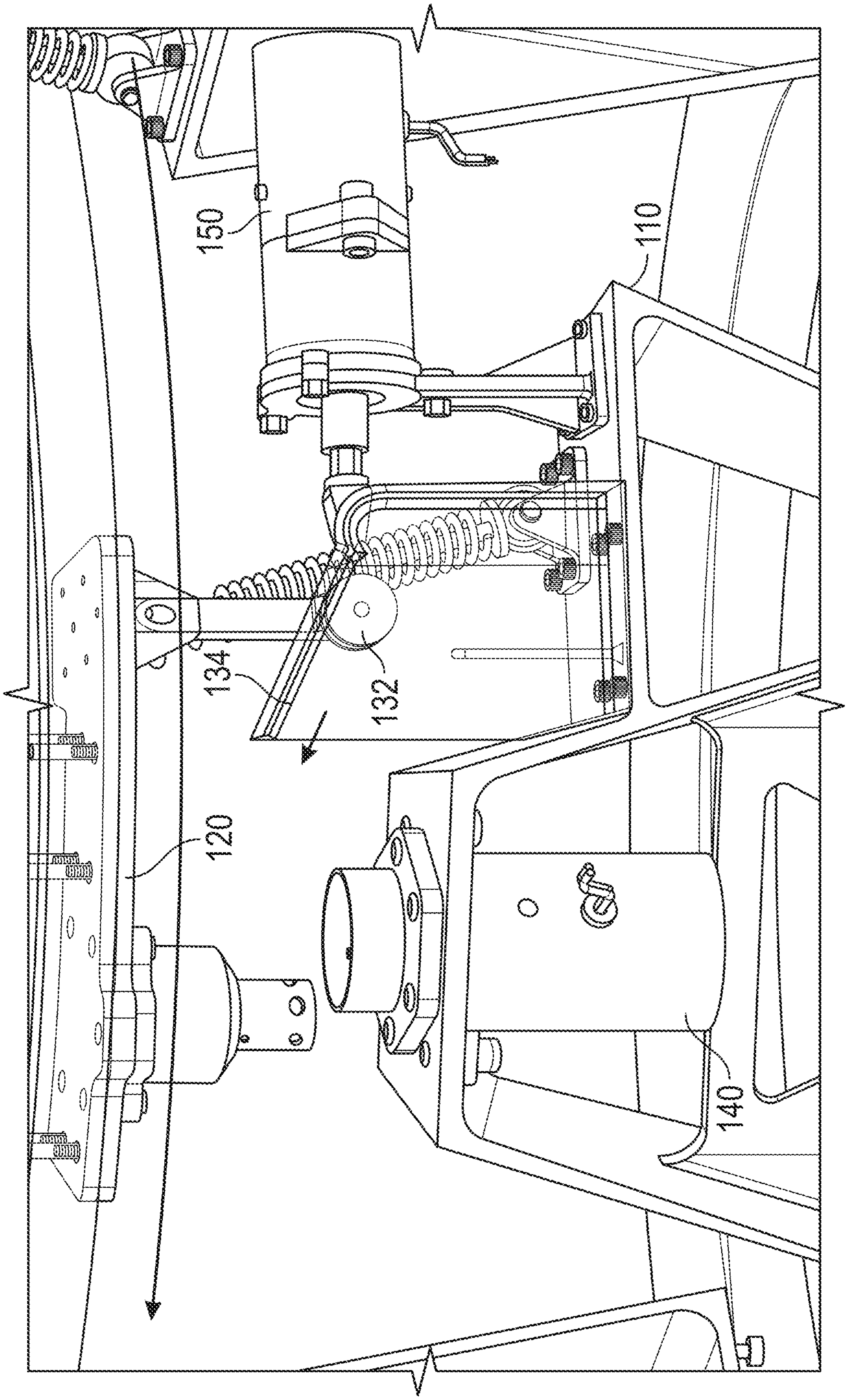
FIG. 2E is a side view of the spin ejection mechanism of FIG. 1 depicting movement of a guide roller along a guide rail in accordance with an embodiment.
Figure 2F:
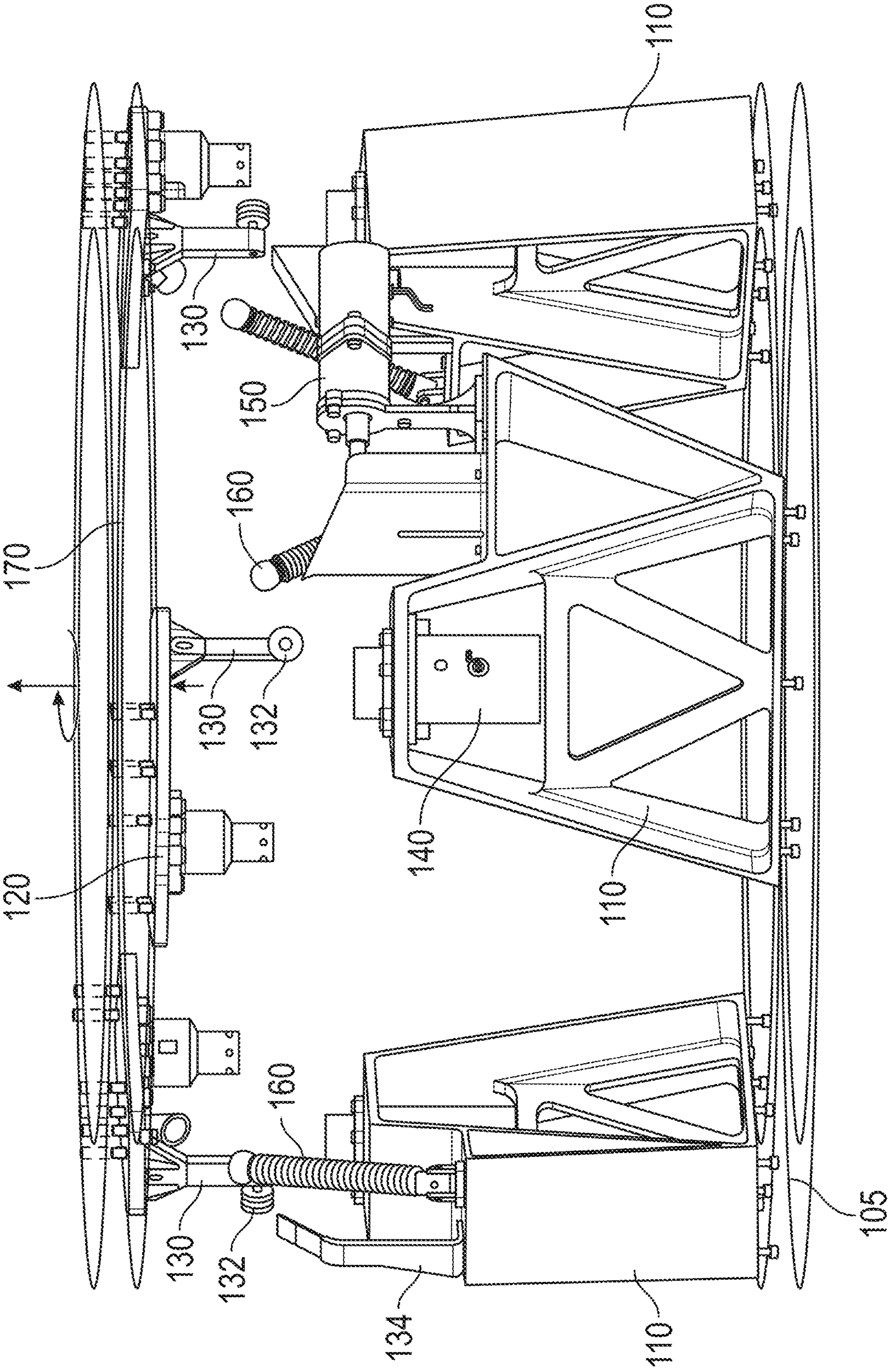
FIG. 2F is a side view of the spin ejection mechanism of FIG. 1 depicting deployment of a payload in accordance with an embodiment.

FIGS. 2C and 2D depicts release of the spring-loaded lock mechanism 150. The spring-loaded lock mechanism 150 may be configured to cause the axial and rotational movement of the second bracket 120. In some embodiments, the spring-loaded lock mechanism 150 provides sufficient force to displace the guide roller 132 from the cradle 136 in multiple guide mechanisms 130 of a spin ejection mechanism 100. In an embodiment, the force applied by the spring loaded lock mechanism 150 is tangential to the mechanism 100. The components of the spring-loaded lock mechanism 150 are described in further detail below with regards to FIGS. 7 and 8. FIG. 2E depicts movement of the guide roller 132 along the guide rail 134. FIG. 2F depicts deployment of the second bracket 120, propelling the payload 170.

The components of the spin ejection mechanism 100 may be composed of materials suitable for use in outer space or on extraterrestrial sites. By way of non-limiting example, the lock mechanisms 140 and 150, cup 142, cone structure 144, fastener 145, guide roller 132, and/or guide rails 124 may be composed of aluminum or stainless steel.

Figure 4:
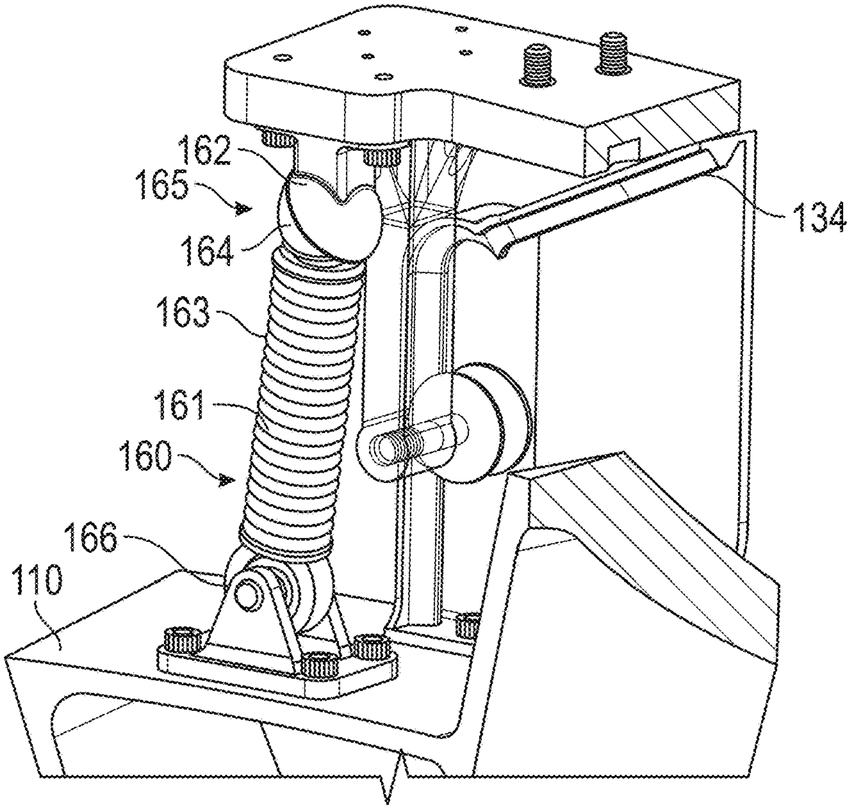
FIG. 4 is a perspective view of the guide mechanism and the spring assembly of FIG. 1 in accordance with an embodiment.
Figure 5:
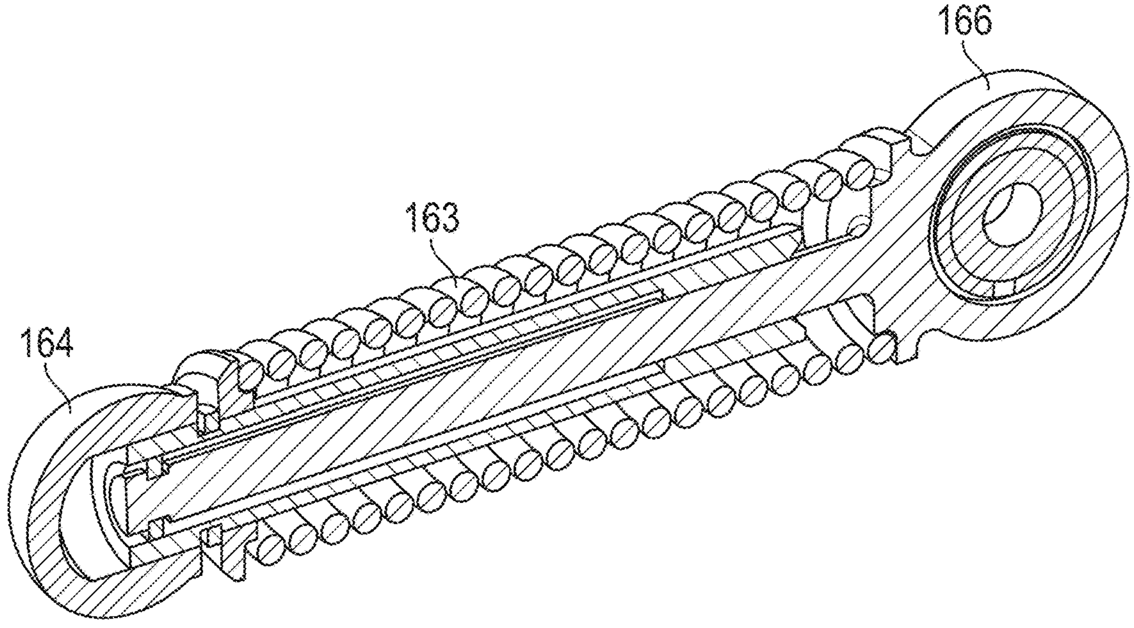
FIG. 5 is a section view of a spring assembly of FIG. 1 in accordance with an embodiment.

Referring now to FIGS. 4 and 5, each spring assembly 160 may include a body 161 having an end pivotally coupled to the first bracket 110. For example, the end may be pivotally coupled by a cylindrical bearing hinged mounting point 166. In some embodiments, each spring assembly 160 is connected to a second bracket 120 by an open ball and socket interface 165 on an end opposing the end pivotably coupled to the first bracket 110. For example, the spring assembly 160 may include a ball joint 164 situated on an end releasably coupled to the socket 162 of the second bracket 120. In some embodiments, disposed about the body 161 is a biasing member, such as compression spring 163, that applies a force on the socket 162.

The spring assembly 160 may be configured to move from a compressed state to an expanded position upon release of the releasable lock mechanism 140. In some embodiments, the spring assembly 160 measures from 50 to 80 mm in length in a compressed state. In further embodiments, the spring assembly 160 measures from 60 to 70 mm in length in a compressed state. In some embodiments, the spring assembly 160 measures from 100 to 150 mm in length an expanded position. In further embodiments, the spring assembly 160 measures from 125 to 140 mm in length at an expanded position.

Figure 7:
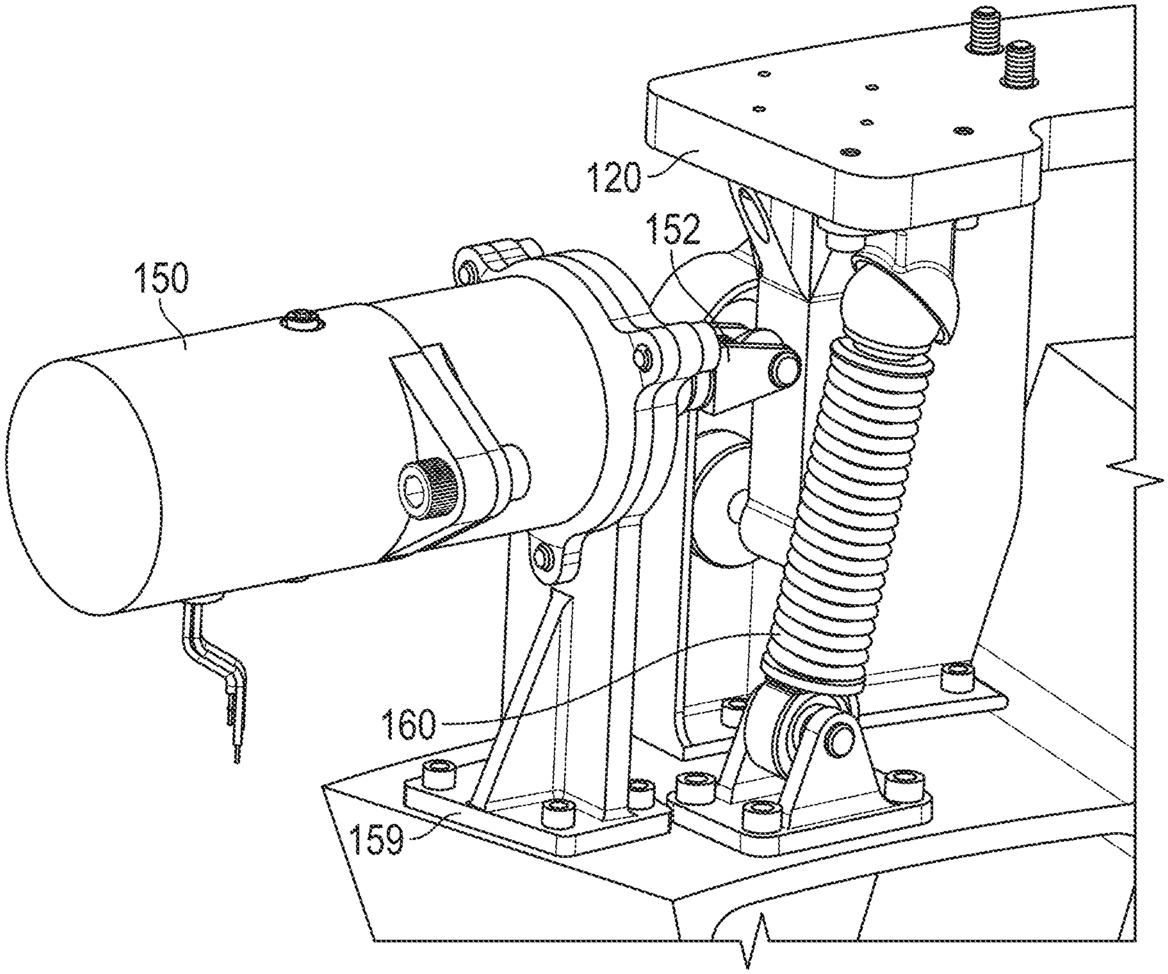
FIG. 7 is a perspective view of the spring-loaded lock mechanism of FIG. 1 in accordance with an embodiment.
Figure 8:
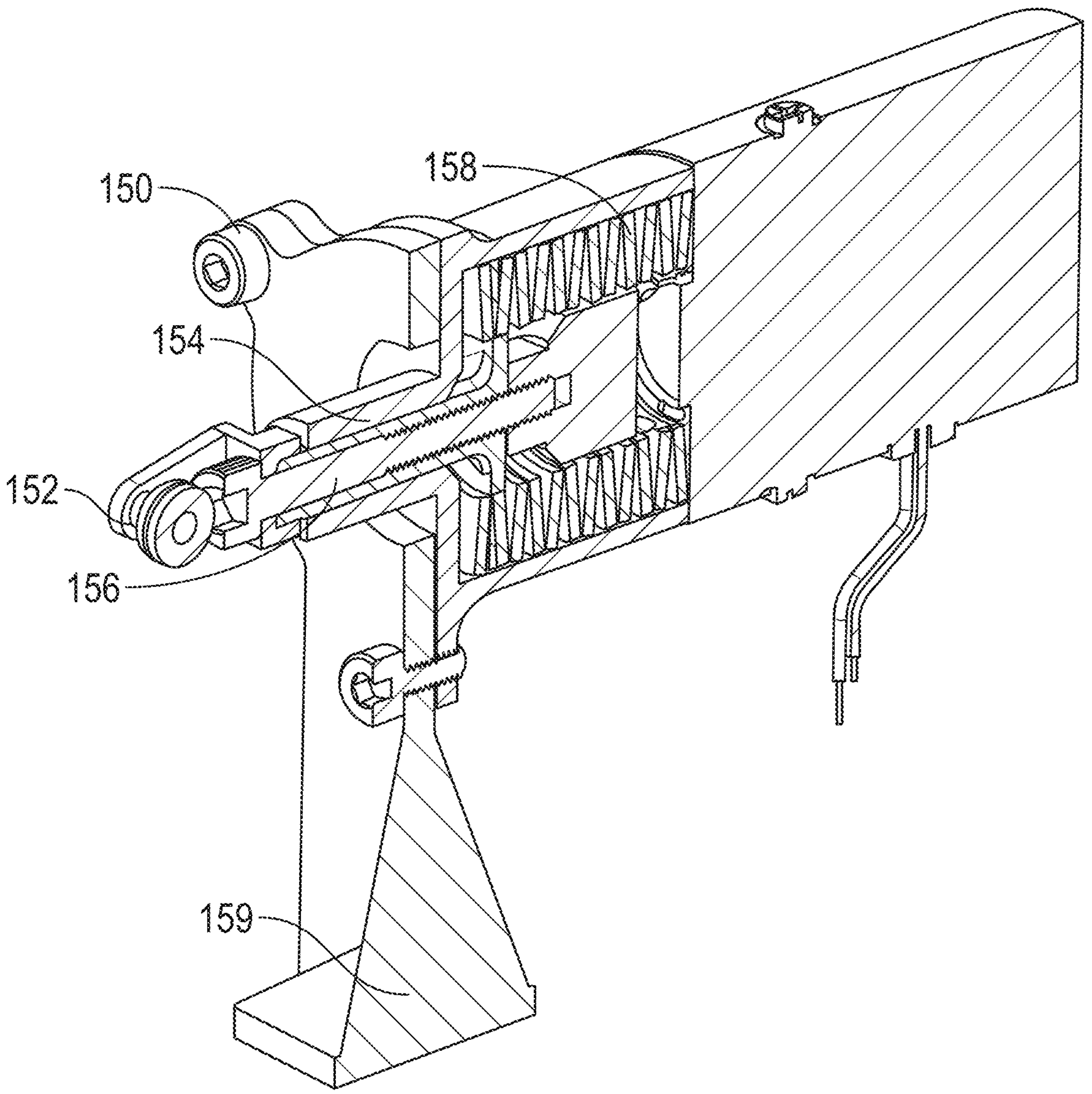
FIG. 8 is a section view of the spring-loaded lock mechanism of FIG. 1 in accordance with an embodiment.

Referring now to FIGS. 7 and 8, the spring-loaded lock mechanism 150 includes a kick-off roller 152 positioned to move the guide roller 132 out of the cradle 136. At time of activation of the spring-loaded lock mechanism 150, a biasing member, such as a stack of compressed washers 158 (for example, Belleville washers), within the mechanism 150 are released, extending a pushrod or piston 154 outwardly from the mechanism 150. A preloaded fastener 156 may be housing within the pushrod/piston 154. In some embodiments, the spring-loaded lock mechanism 150 is secured to a first bracket 110 by a mounting bracket 119.

Figure 9A:
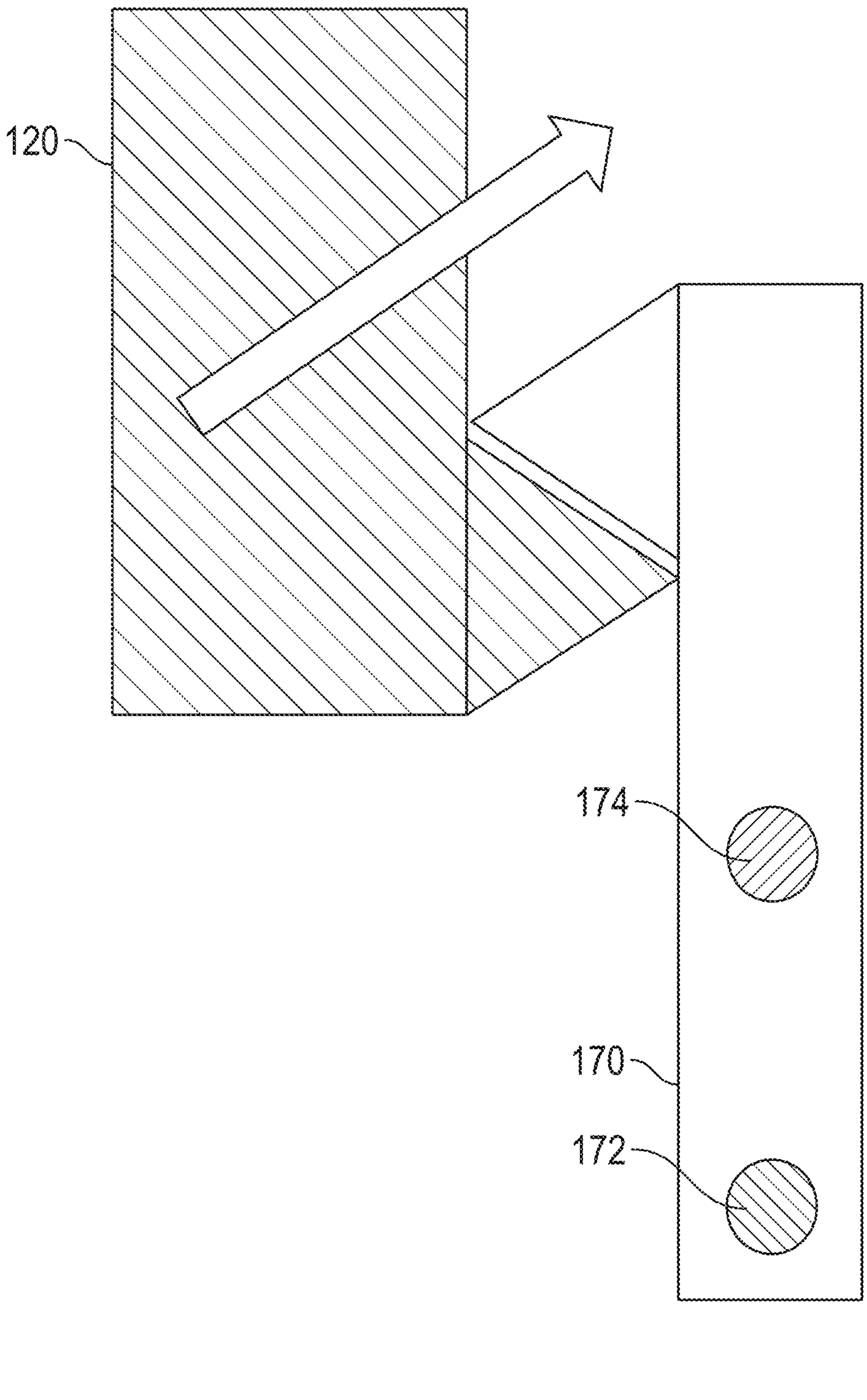
FIG. 9A is a schematic depiction of a latch mechanism in accordance with an embodiment.
Figure 9B:
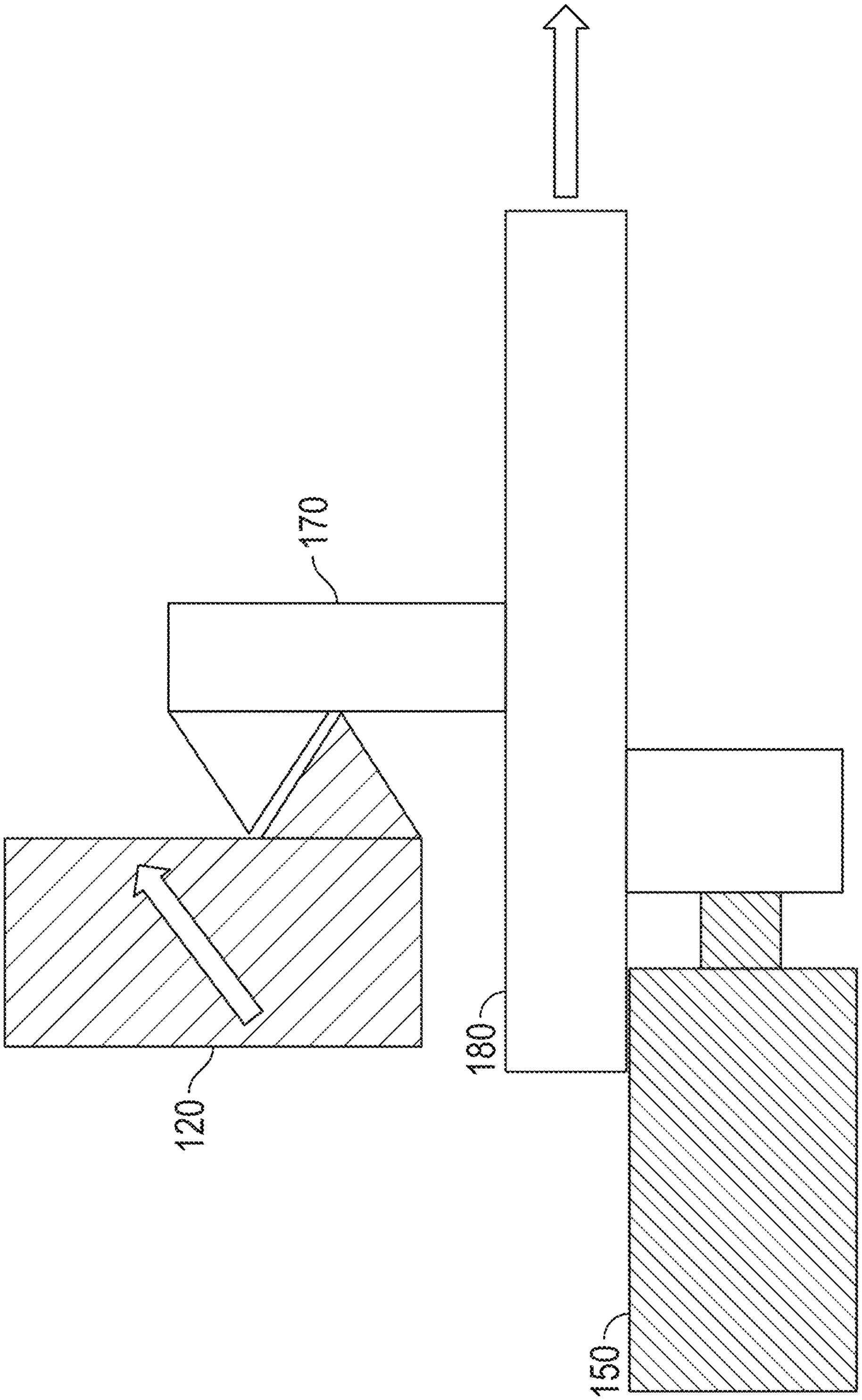
FIG. 9B is a schematic depiction of release of a latch mechanism in accordance with an embodiment.
Figure 10:
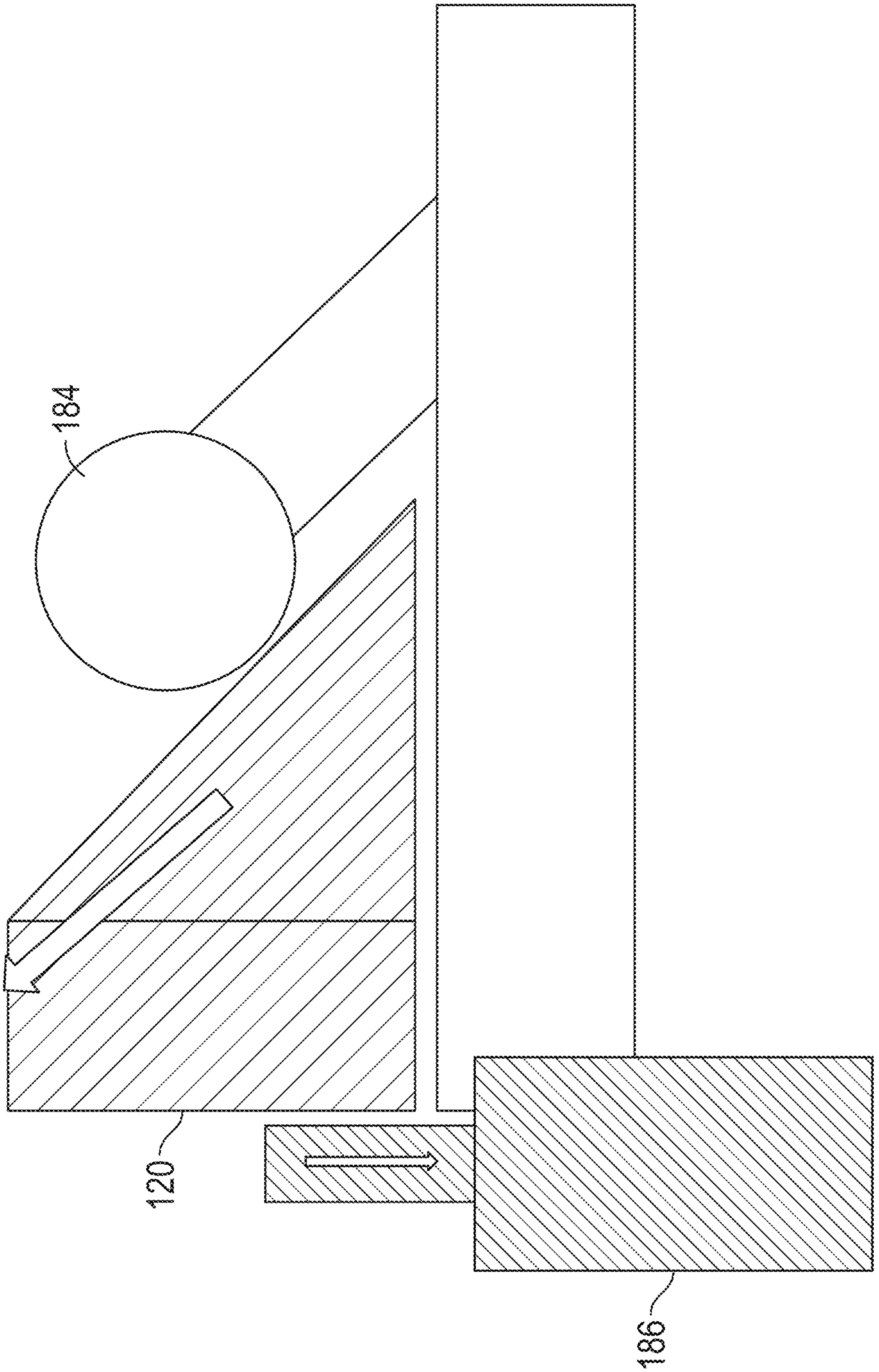
FIG. 10 is a schematic depiction of a retention pin in accordance with an embodiment.
Figure 11:
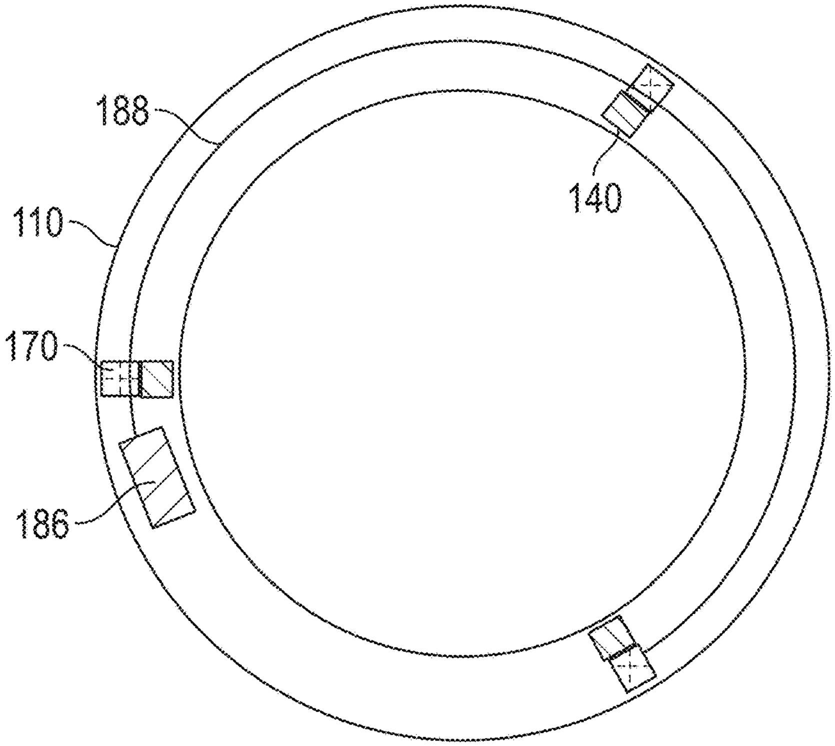
FIG. 11 is a top view of a spin ejection mechanism having a pin puller and connected latch mechanisms in accordance with an embodiment.

Referring now to FIGS. 9A to 13, an alternate embodiment is shown of the spin ejection mechanism 100 including latches and pulleys. For example, one or more latches 170 may hold at least one second bracket 120 in place. FIG. 11 depicts three latches with associated launch locks by way of non-limiting example. The latch 170 may include a release pin 172 situated at an end of the latch 170 proximate to the first bracket 110. The latch 170 may further include a pivot 174 within the latch 170 positioned in a direction from the release pin 172 opposite the first bracket 110. In some embodiments, the latch 170 is configured to release the second bracket 120 by moving about the pivot 174 radially outward from the second bracket 120.

In some embodiments, releasable lock mechanisms 140 release and cause the second bracket 120 to start rotation and axial motion until the second bracket 120 becomes preloaded into one or more latches 170.

FIG. 9B depicts an embodiment where a latch plate 180 is secured to each latch 170. In such an embodiment, a spring-loaded lock mechanism 150 may be deployed to release the latch plate 180, rotating the latch plate 180 and coupled latches 170 away from the second bracket 120 and allowing deployment of a payload.

Referring now to FIG. 10, an embodiment of the spin ejection mechanism 100 is shown that may include a retention pin 184 preventing rotation and axial motion of the second bracket 120. In such an embodiment, releasable lock mechanisms 140 release and cause the second bracket 120 to start rotation and axial motion until the second bracket 120 becomes restrained by the retention pin 184. The retention pin 184 may be retracted to allow rotation and axial motion of the second bracket 120. The retention pin 184 may be retracted by a pin puller 186 operably connected to the retention pin 184, for example by a cable.

Figure 12:
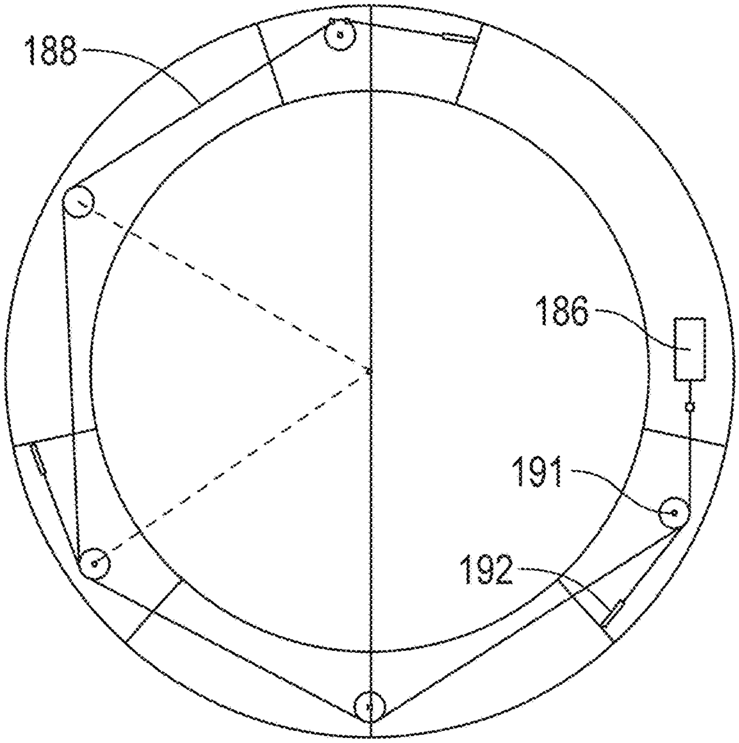
FIG. 12 is a top view of a spin ejection mechanism having a vertical pulley and pulley stack in accordance with an embodiment.
Figure 13:
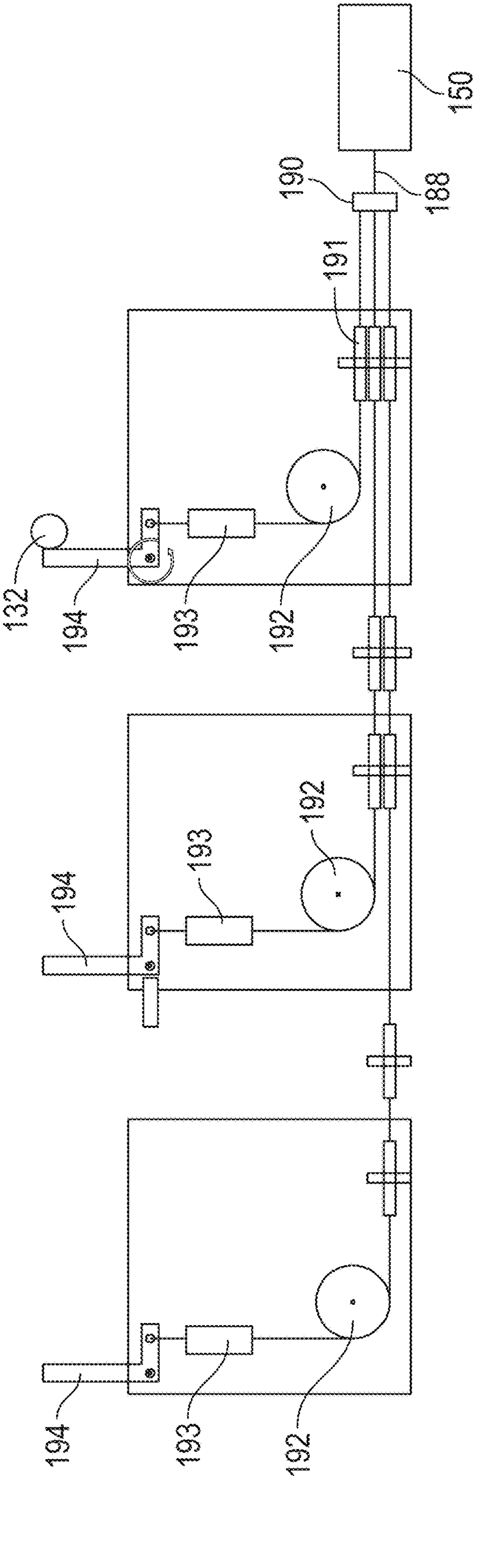
FIG. 13 is a side view of the spin ejection mechanism of FIG. 12 in accordance with an embodiment.

Referring now to FIGS. 11-13, in some embodiments a pin puller 186 (or spring-loaded mechanism 150) may pull on a cable or series of cables 188 that simultaneously releases each latch 170. The cable 188 coupled to spring-loaded mechanism 150 may pass through a cable guide interface 190. The cabling 188 may then pass through to a pulley stack 191. Further cabling 188 may pass through to a vertical pulley 192. The cabling 188 may continue to tensioner spring 193. The cabling 188 may terminate at a retention tab 194.

The retention tab 194 (FIG. 13) may, in a first position, restrain axial movement of a guide roller 132. Release of the spring-loaded mechanism 150 results in release of the guide roller 132, for example by tensioning the cable 188 through the cable guide interface 190, pulley stack 191, vertical pulley 192, and tensioner spring 193 to rotate the retention tab 194 out of the path of the guide roller 132.

Referring to FIG. 13, the spin ejection mechanism 100 may include a vertical pulley 192, tensioner spring 193, and retention tab 194 for each guide roller 132. In embodiments with multiple guide rollers 132, cabling 188 extending from the pulley stack 191 connected to the cable guide interface 190 may extend to other pulley stacks in series. The configuration of pulley stacks 191 allows a single spring-loaded lock mechanism 150 to actuate each pulley stack 191 at once.

It should be appreciated that while embodiments herein may refer to the use of the spin ejection mechanism with respect to a particular application, such as a spacecraft that is returning sample materials from an extraterrestrial location, such as the moon or lunar surface, this is for example purposes and the claims should not be so limited. In other embodiments, the spin ejection mechanism described herein may be used in connection with spacecraft originating from other terrestrial or extraterrestrial bodies, such as but not limited to Mars, asteroids, Kupier Belt objects, and Trans-Neptunian objects for example. In still further embodiments, the spin ejection mechanism may be used on moons/satellite objects of other solar system planets, such as Titan or Europa for example.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It should also be noted that the terms "first", "second", "third", "upper", "lower", and the like may be used herein to modify various elements. These modifiers do not imply a spatial, sequential, or hierarchical order to the modified elements unless specifically stated.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A spin ejection mechanism comprising:

a first bracket;

at least one second bracket spaced apart from the first bracket;

at least one latch comprising a latch plate, the at least one latch operably coupled between the first bracket and one of the at least one second bracket;

at least one releasable lock mechanism operably coupled to the at least one second bracket and configured to initiate restrained movement of one of the at least one second bracket, the at least one latch configured to axially restrain the at least one second bracket upon contact with the at least one second bracket after the restrained movement is initiated; and a spring-loaded lock mechanism coupled to the latch plate and configured to release the latch plate, rotating the at least one latch away from the at least one second bracket and allowing unrestrained movement of the at least one second bracket.

2. The mechanism of claim 1, wherein the at least one latch comprises three latches.

3. The mechanism of claim 1, wherein the at least one latch comprises a release pin situated at an end of the at least one latch proximate to the first bracket.

4. The mechanism of claim 3, wherein the at least one latch comprises a pivot within the at least one latch positioned in a direction from the release pin opposite the first bracket.

5. The mechanism of claim 4, wherein the at least one latch is configured to allow unrestrained movement of the at least one second bracket by moving about the pivot radially outward from the at least one second bracket.

6. The mechanism of claim 1, wherein the spring-loaded lock mechanism is arranged perpendicular to a plane of the first bracket.

7. The mechanism of claim 1, wherein each of the at least one releasable lock mechanism are configured to activate in series.

8. The mechanism of claim 1, further comprising a spring assembly operably coupled between the first bracket and one of the at least one second bracket in a compressed position.

9. The mechanism of claim 8, wherein the spring assembly is configured to move to an expanded position upon release of the spring-loaded lock mechanism.

10. The mechanism of claim 9, wherein the spring assembly is configured to propel the at least one second bracket as the spring assembly moves to the expanded position.

11. The mechanism of claim 1, wherein the spin ejection mechanism is configured to launch an object situated on the at least one second bracket.

12. A spin ejection mechanism comprising:

a first bracket;

a plurality of second brackets spaced apart from the first bracket;

at least one guide mechanism operably coupled between the first bracket and one of the plurality of second brackets; and a plurality of releasable lock mechanisms operably coupled to the plurality of second brackets and configured to initiate restrained movement of one of the at least one guide mechanism without simultaneous release of all of the plurality of releasable lock mechanisms.

13. The mechanism of claim 12, wherein the at least one guide mechanism comprises:

at least one guide roller; and a helical guide rail engaged with the at least one guide roller, wherein the at least one guide mechanism is configured to move the at least one guide roller along the helical guide rail upon release of a latch.

14. The mechanism of claim 13, wherein the helical guide rail comprises a cradle configured to retain the at least one guide roller in a second position.

15. The mechanism of claim 14, wherein the plurality of releasable lock mechanisms are configured to move the at least one guide roller into the cradle.

16. The mechanism of claim 15, wherein each of the plurality of releasable lock mechanisms are configured to activate in series.

17. The mechanism of claim 12, wherein the mechanism is configured to launch an object situated on the at least one of the plurality of second brackets with reduced tip-off and lateral velocity imparted on the object compared to a similar mechanism with simultaneous release of all of the plurality of releasable lock mechanisms.

18. The mechanism of claim 12, wherein the mechanism is configured to launch an object situated on at least one of the plurality of second brackets imparting low-uncertainty axial velocity and spin rate on the object.

19. The mechanism of claim 12, further comprising a spring-loaded lock mechanism configured to initiate unrestrained movement of the at least one guide mechanism.

20. The mechanism of claim 19, the spring-loaded lock mechanism configured to release one or more of the plurality of releasable lock mechanisms before release of the spring-loaded lock mechanism.

* * * * *